(12) United States Patent
Cummings et al.

(10) Patent No.: US 7,978,953 B2
(45) Date of Patent: Jul. 12, 2011

(54) METHODS FOR VISUALLY INSPECTING INTERFEROMETRIC MODULATORS FOR DEFECTS

(75) Inventors: William J Cummings, Millbrae, CA (US); Brian J Gally, Los Gatos, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 56 days.

(21) Appl. No.: 12/192,817

(22) Filed: Aug. 15, 2008

(65) Prior Publication Data

US 2008/0303531 A1    Dec. 11, 2008

Related U.S. Application Data

(63) Continuation of application No. 11/217,580, filed on Sep. 1, 2005, now Pat. No. 7,415,186.

(60) Provisional application No. 60/613,537, filed on Sep. 27, 2004.

(51) Int. Cl.
*G02F 1/00* (2006.01)
*G02F 1/035* (2006.01)
*G01R 31/08* (2006.01)

(52) U.S. Cl. .................. 385/147; 385/2; 385/8; 324/527

(58) Field of Classification Search .................. None
See application file for complete search history.

(56) References Cited

U.S. PATENT DOCUMENTS

| | | | |
|---|---|---|---|
| 5,175,772 A | 12/1992 | Kahn et al. | |
| 5,559,358 A | 9/1996 | Burns et al. | |
| 6,034,480 A | 3/2000 | Browning et al. | |
| 6,040,937 A | 3/2000 | Miles | |
| 6,088,474 A * | 7/2000 | Dudasko et al. | 382/145 |
| 6,285,207 B1 | 9/2001 | Listwan | |
| RE37,847 E | 9/2002 | Henley et al. | |
| 6,567,715 B1 | 5/2003 | Sinclair et al. | |
| 6,674,090 B1 | 1/2004 | Chua et al. | |
| 6,674,562 B1 | 1/2004 | Miles | |
| 6,777,249 B2 | 8/2004 | Yamazaki | |
| 6,950,193 B1 | 9/2005 | Discenzo | |
| 7,026,821 B2 | 4/2006 | Martin et al. | |
| 7,123,216 B1 * | 10/2006 | Miles | 345/54 |
| 7,126,741 B2 | 10/2006 | Wagner et al. | |
| 7,187,489 B2 | 3/2007 | Miles | |
| 2002/0015215 A1 | 2/2002 | Miles | |
| 2002/0157033 A1 | 10/2002 | Cox | |

(Continued)

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

(Continued)

*Primary Examiner* — Michelle R Connelly Cushwa
(74) *Attorney, Agent, or Firm* — Knobbe Martens Olson & Bear LLP

(57) ABSTRACT

A method is provided for visual inspection of an array of interferometric modulators in various driven states. This method may include driving multiple columns or rows of interferometric modulators via a single test pad or test lead, such as test pad, and then observing the array for discrepancies between the expected optical output and the actual optical output of the array. This method may particularly include, for example, driving a set of non-adjacent rows or columns to a state different from the intervening rows or columns and then observing the optical output of the array.

17 Claims, 19 Drawing Sheets

U.S. PATENT DOCUMENTS

2008/0088638 A9    4/2008    Miles

OTHER PUBLICATIONS

Aratani et al., "Surface Micromachined Tuneable Interferometer Array," Sensors and Actuators, pp. 17-23 (1994).
Conner, "Hybrid Color Display Using Optical Interference Filter Array," SID Digest, pp. 577-580 (1993).
Durr et al., "Reliability Test and Failure Analysis of Optical MEMS", Proceedings of the 9th International Symposium on the Physical and Failure Analysis of Integrated Circuits, pp. 201-206, (Jul. 8-12, 2002).
Raley et al., "A Fabry-Perot Microinterferometer for Visible Wavelengths," IEEE Solid-State Sensor and Actuator Workshop, Hilton Head, SC (1992).
Skaggs et al, "Automatic Testing of the Digital Micromirror Device", IEEE/LEOS 1996 Summer Topical Meetings, pp. 11-12, (Aug. 5-9, 1996).
Srikar et al., "A Critical Review of Microscale Mechanical Testing Methods Used in the Design of Microelectromechanical Systems," Society for Experimental mechanics, vol. 43, No. 3, (2003).
IPRP for PCT/US05/034464 filed Sep. 23, 2005.
ISR and WO for PCT Application No. PCT/US2005/034464, filed Sep. 23, 2005.
Office Action dated Nov. 2, 2007 in U.S. Appl. No. 11/217,580.
Office Action dated Jul. 11, 2008 in Chinese App. No. 200580032120.9.
Decision of Rejection dated Apr. 24, 2009 in Chinese App. No. 200580032120.9.

* cited by examiner

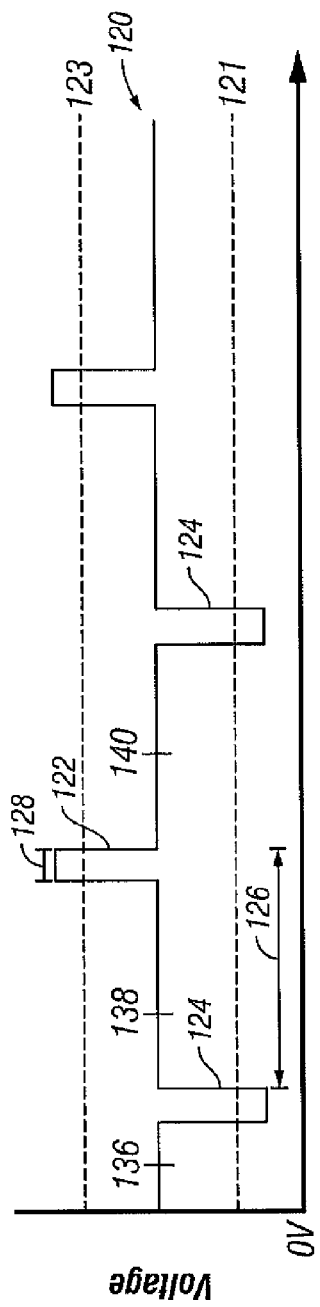
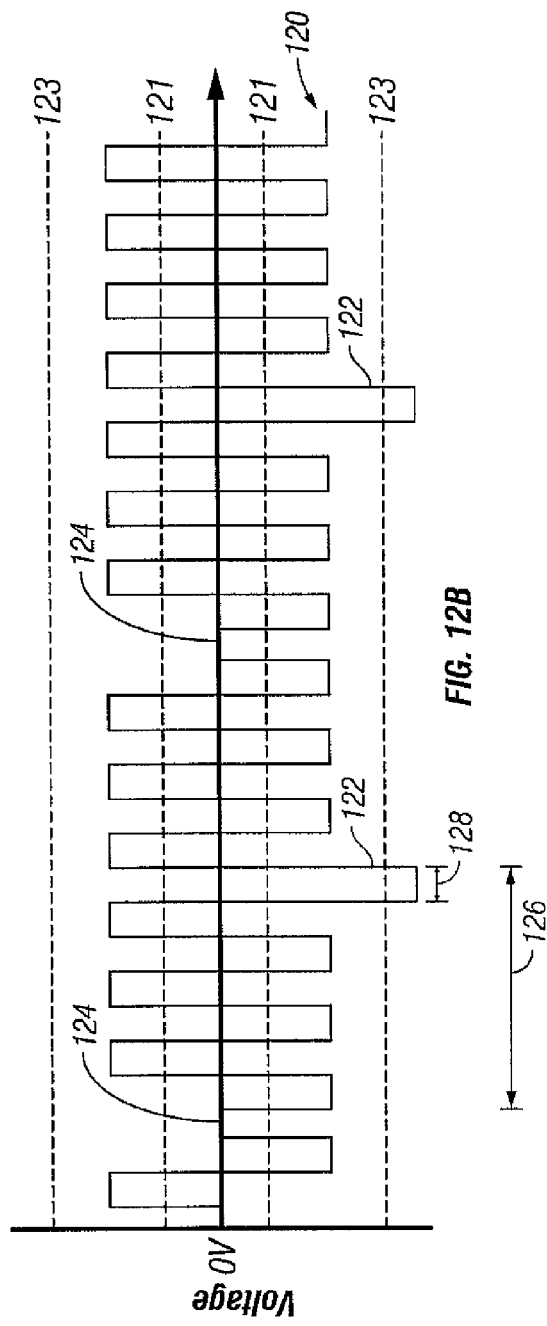
FIG. 12A
FIG. 12B

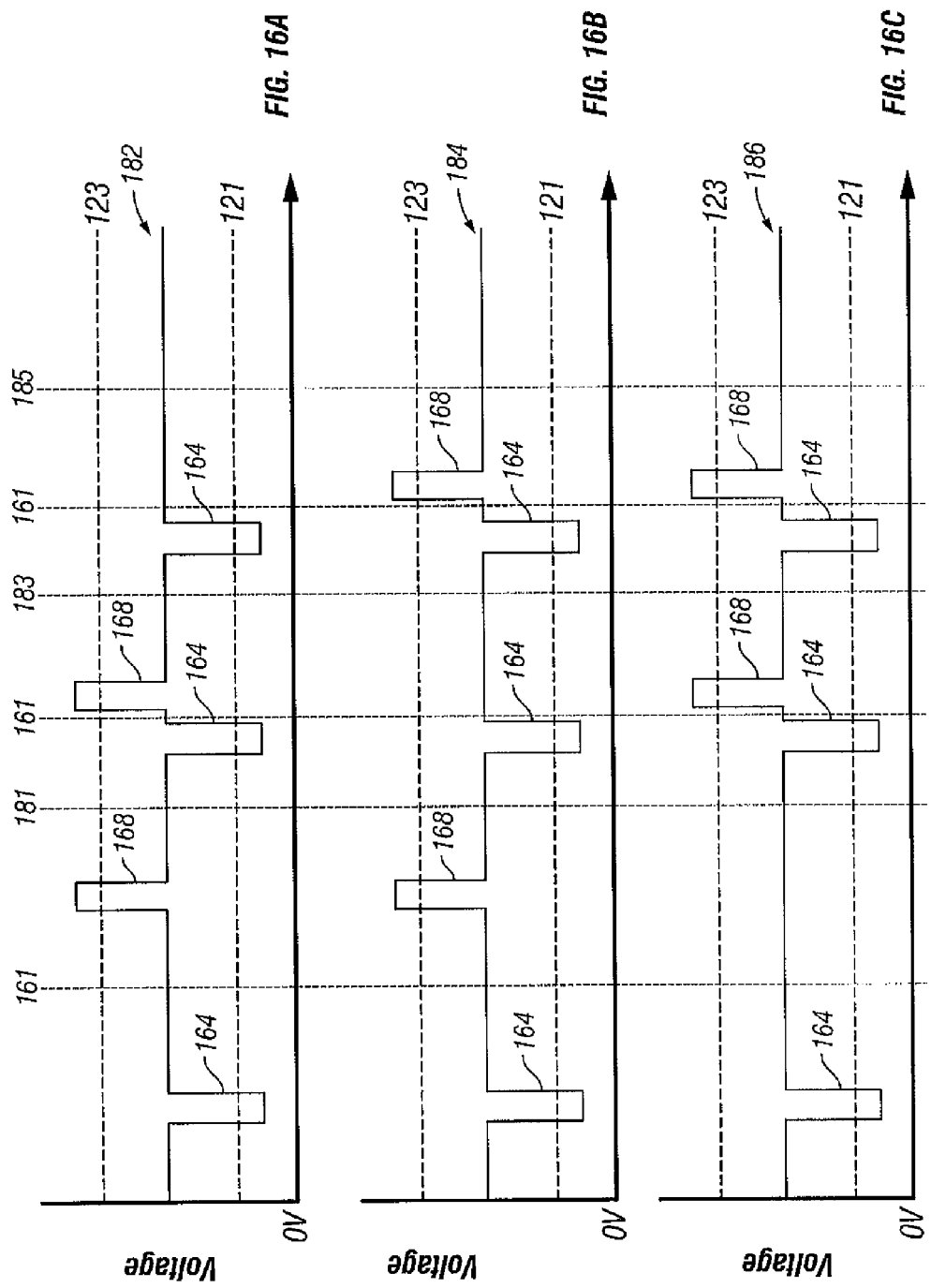

US 7,978,953 B2

METHODS FOR VISUALLY INSPECTING INTERFEROMETRIC MODULATORS FOR DEFECTS

CROSS-REFERENCE TO RELATED APPLICATIONS

This application is a continuation of U.S. patent application Ser. No. 11/217,580, filed Sep. 1, 2005, now U.S. Pat. No. 7,415,186, which claims priority under 35 U.S.C. §119(e) to U.S. Provisional Application No. 60/613,537, filed on Sep. 27, 2004, which are both hereby incorporated by reference in its entirety.

BACKGROUND

1. Field of the Invention

This invention relates to the testing of microelectromechanical devices, and in particular the testing of interferometric modulator-based displays.

2. Description of the Related Art

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

It is desirable to provide efficient methods for visually inspecting arrays of interferometric modulators for defects. Particularly, it is desirable to provide a method of visually inspecting interferometric modulators which is capable of detecting a wide range of potential defects in the arrays. It is also desirable to provide a method of inspecting arrays of interferometric modulators which minimizes the time and complexity of preparing the arrays for inspection.

SUMMARY

In one embodiment, a method of testing an array of interferometric modulators is provided, the method including applying a first signal at least partly contemporaneously to a first plurality of non-adjacent columns of interferometric modulators to place the interferometric modulators in the first plurality of non-adjacent columns in an actuated state, and inspecting the array of interferometric modulators to identify defects in the array, wherein the inspecting is performed after application of the first signal.

In another embodiment, a method of testing an array of interferometric modulators is provided, including applying a first waveform at least partly contemporaneously to each of a first plurality of non-adjacent rows of interferometric modulators, applying a second waveform at least partly contemporaneously to each of a second plurality of non-adjacent rows of interferometric modulators, applying a third waveform at least partly contemporaneously to each of a first plurality of non-adjacent columns of interferometric modulators, applying a fourth waveform at least partly contemporaneously to each of a second plurality of non-adjacent columns of interferometric modulators, and inspecting the array of interferometric modulators to identify defects in the array.

In another embodiment, a method of inspecting an array of interferometric modulators is provided, including driving each modulator in the array of interferometric modulators to a known first state, driving a subset of columns of interferometric modulators within the array from the known first state to a second state, wherein the second state is the opposite of the first state; and inspecting the array of interferometric modulators to identify defects in the array.

In another embodiment a device is provided, including a substrate, a first plurality of non-adjacent row electrodes supported by the substrate, a second plurality of non-adjacent row electrodes supported by the substrate, a first buss bar in electrical connection with the first plurality of row electrodes, a second buss bar in electrical connection with the second plurality of row electrodes, a first plurality of non-adjacent column electrodes spaced apart from the substrate, a second plurality of non-adjacent column electrodes spaced apart from the substrate, a third buss bar in electrical communication with the first plurality of column electrodes, and a fourth buss bar in electrical communication with the first plurality of column electrodes.

In yet another embodiment, a device is provided, comprising first means for conducting a first plurality of signals, means for supporting the first means for conducting a plurality of signals, second means for conducting a second plurality of signals, first means for selectively providing a waveform to each of a first portion of the first conducting means, second means for selectively providing a waveform to each of a second portion of the first conducting means, third means for selectively providing a waveform to each of a first portion of the second conducting means, and fourth means for selectively providing a waveform to each of a second portion of the second conducting means where each of the first, second, third and fourth conducting means are arranged such that the signal carried by the conducting means generates a test pattern.

BRIEF DESCRIPTION OF THE DRAWINGS

FIGS. 12A and 12B illustrate exemplary waveforms which may be applied to portions of an array of interferometric modulators to generate a desired display pattern during testing.

FIGS. 16A, 16B, and 16C illustrate alternate exemplary waveforms which may be applied to portions of an array of interferometric modulators to generate a desired display pattern during testing.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Visual inspection is a particularly effective method of inspecting arrays of interferometric modulators for defects. Particular display patterns may be sequentially presented, and the output may be analyzed, either by an inspector or by an automated system, such as one including a CCD camera. In particular, selective actuation of non-adjacent rows or columns advantageously facilitates the identification of such defects as open rows, or row-to-row shorts. The use of a temporary diffuser placed over the array being tested advantageously facilitates the inspection of the array while avoiding the additional cost and extra work of applying a diffuser to an array which may later be identified and discarded.

Figure 1:
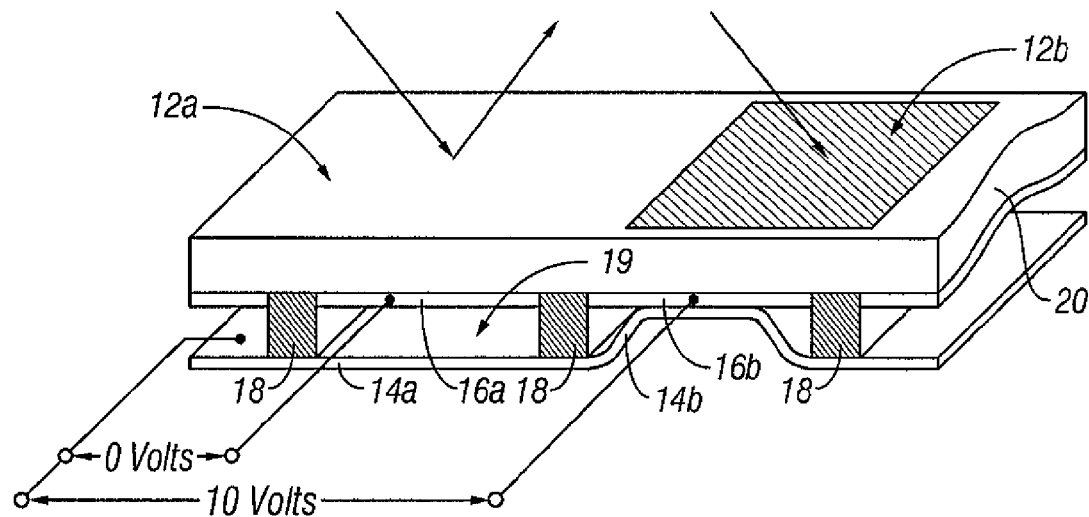
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
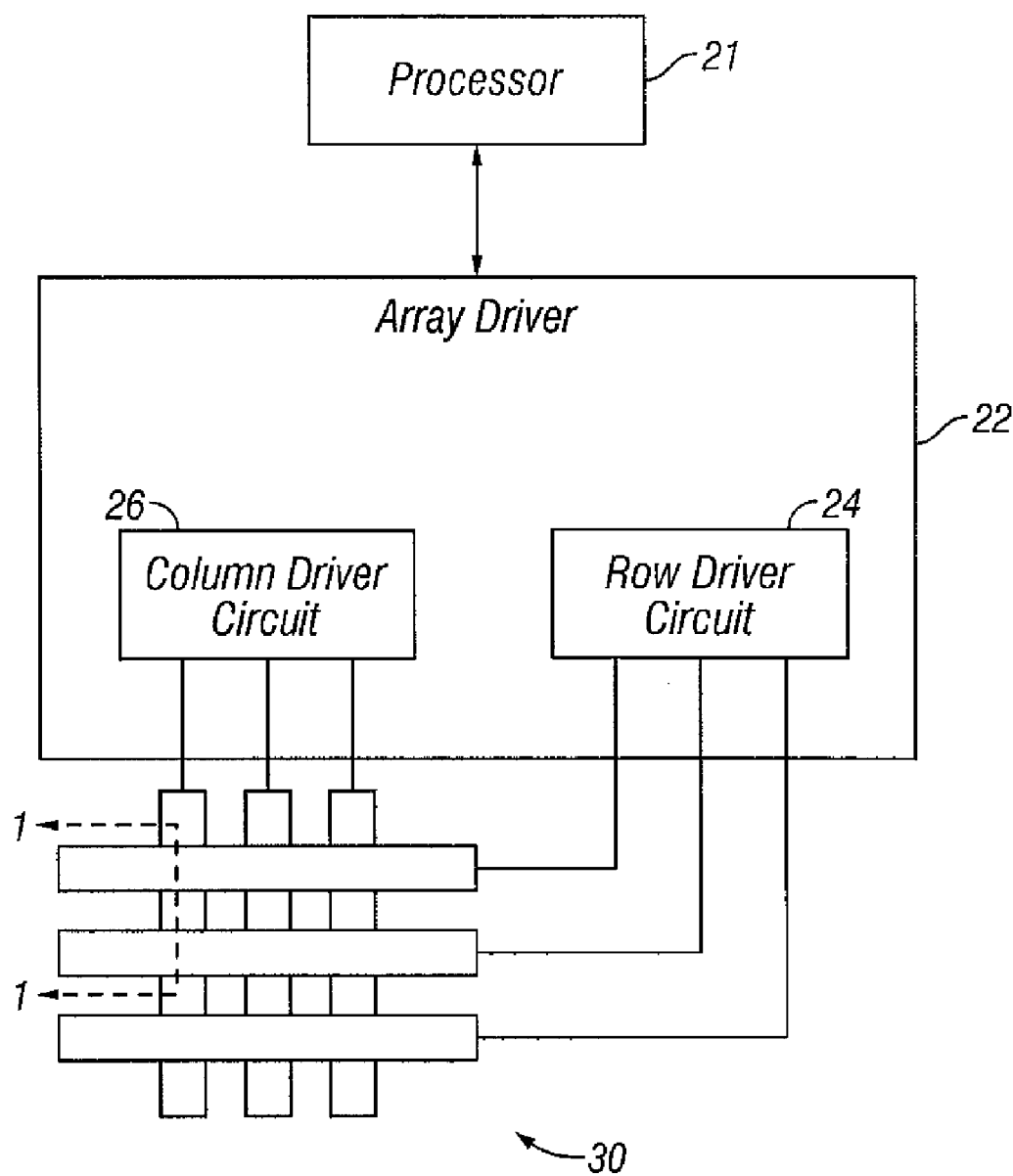
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
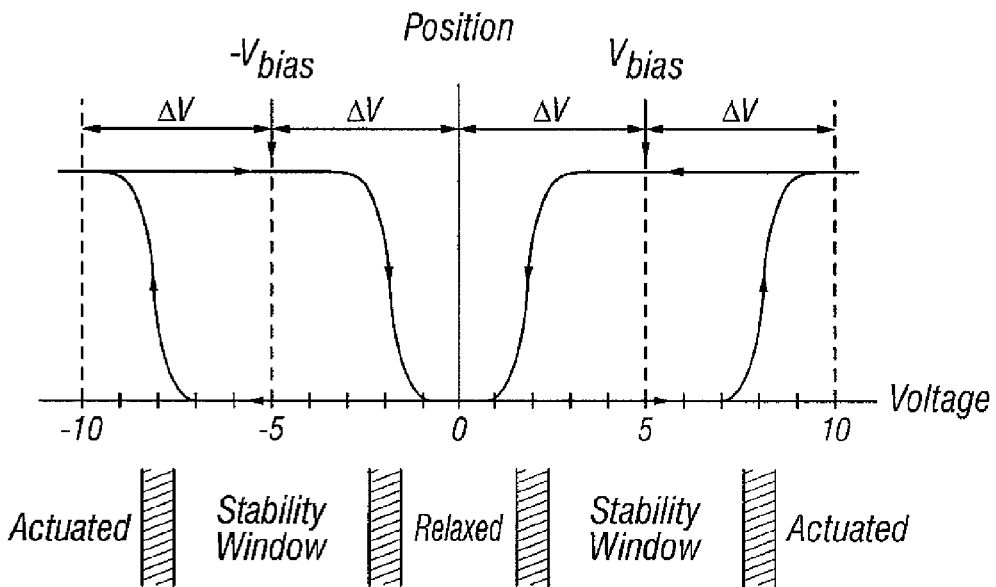
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
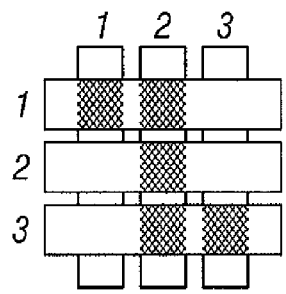
FIG. 5A illustrates one exemplary frame of display data in the 3×3 interferometric modulator display of FIG. 2.
Figure 5B:
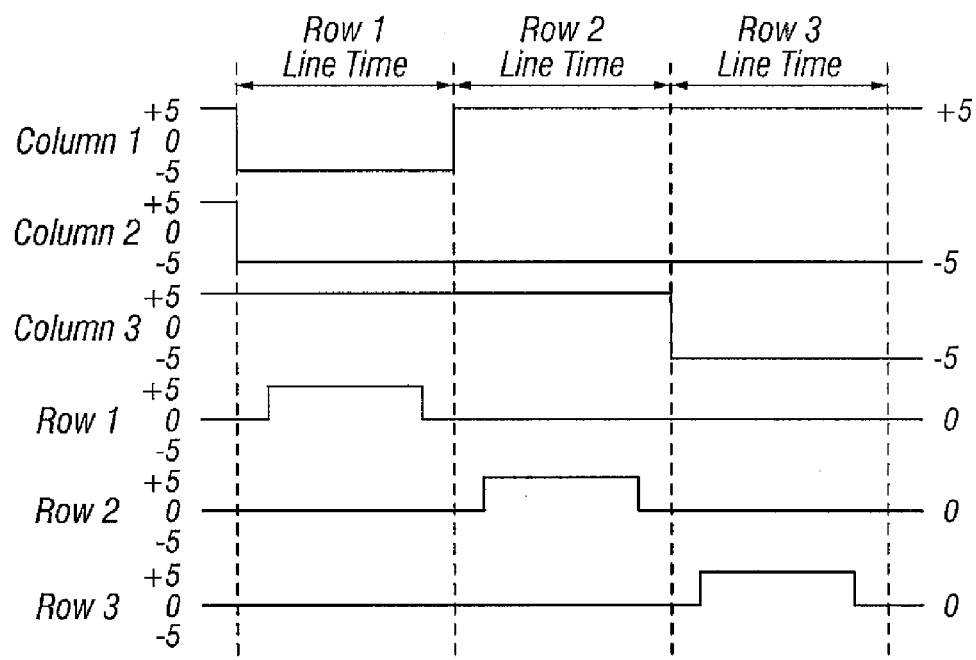
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
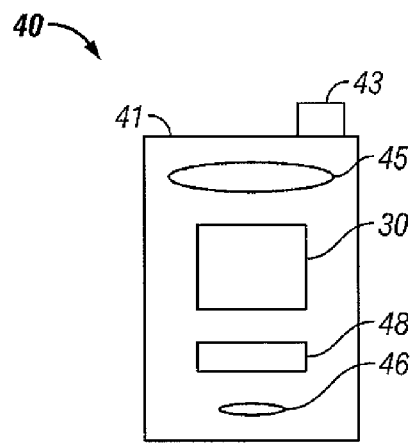
FIGS. 6A and 6B are system block diagrams illustrating an embodiment of a visual display device comprising a plurality of interferometric modulators.
Figure 6B:
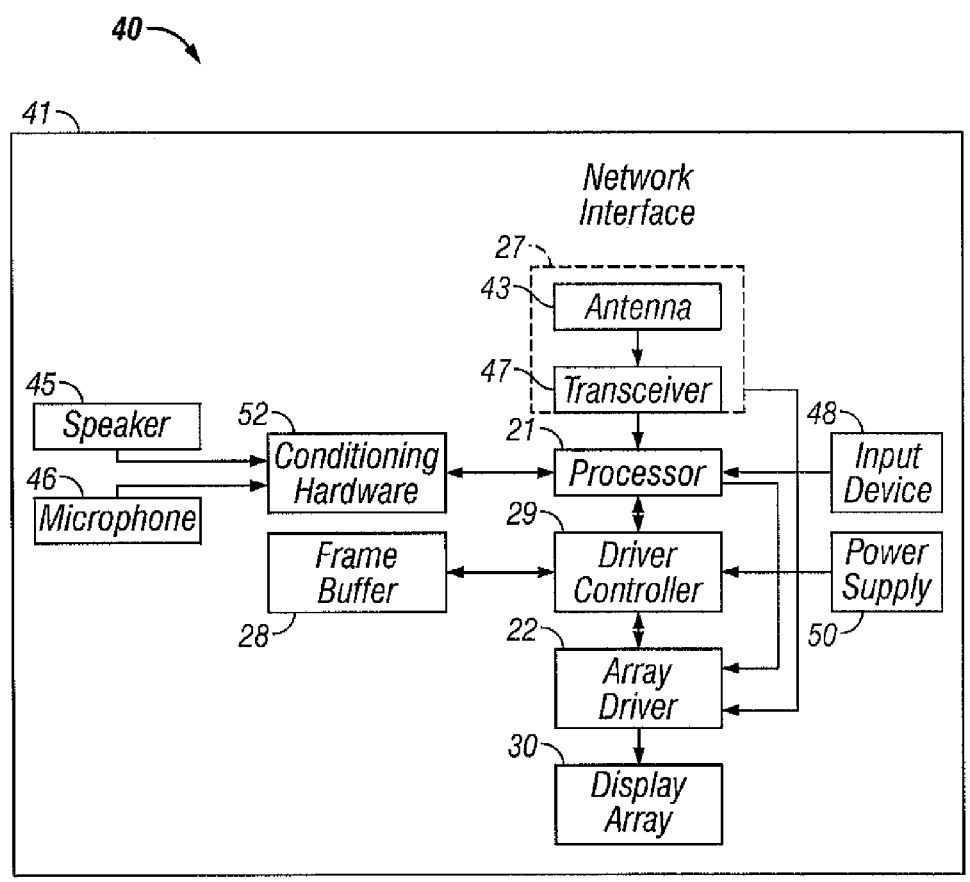

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
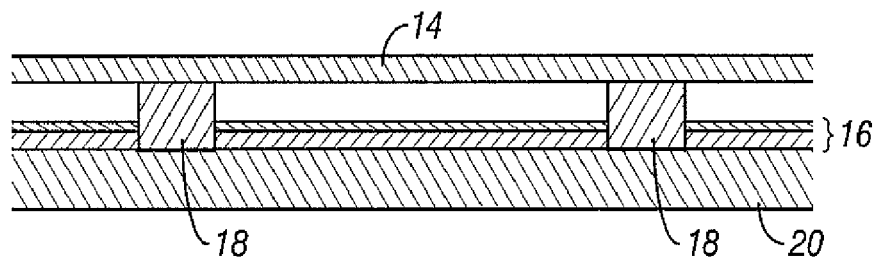
FIG. 7A is a cross section of the device of FIG. 1.
Figure 7B:
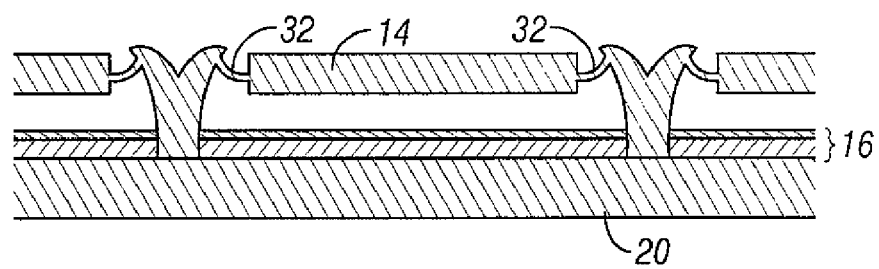
FIG. 7B is a cross section of an alternative embodiment of an interferometric modulator.
Figure 7C:
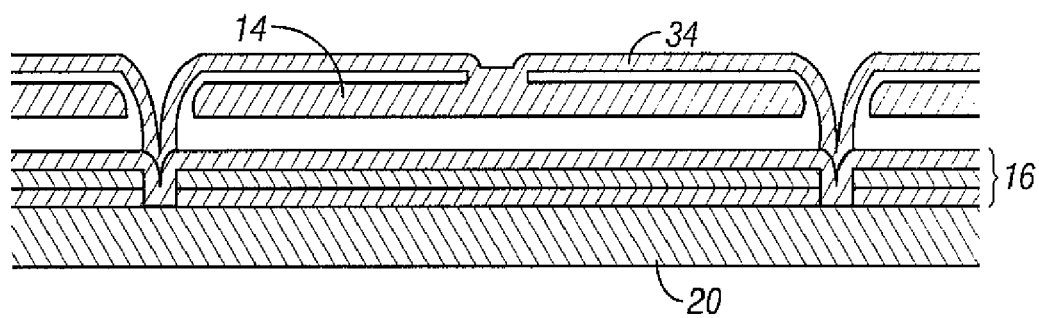
FIG. 7C is a cross section of another alternative embodiment of an interferometric modulator.
Figure 7D:
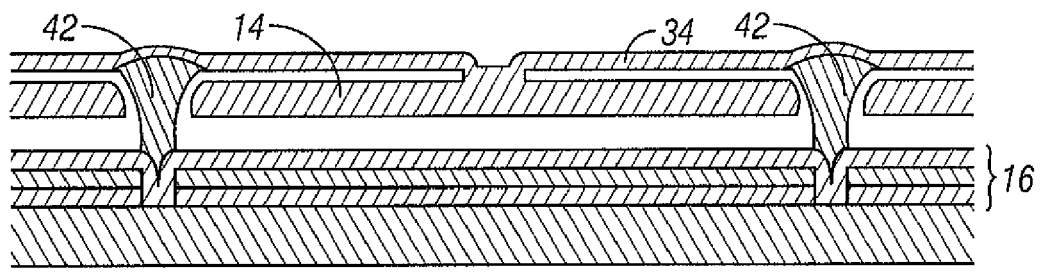
FIG. 7D is a cross section of yet another alternative embodiment of an interferometric modulator.
Figure 7E:
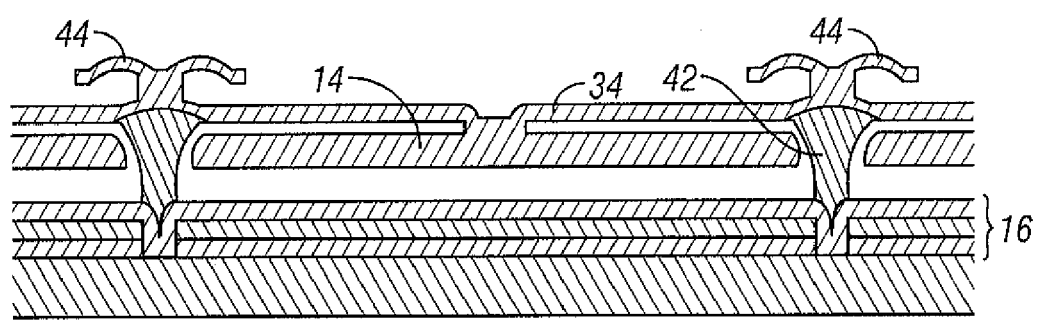
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties Several types of defects may exist in arrays of interferometric modulators, such as the arrays of FIG. 2. While these arrays may be tested using many different methods, one method for inspecting an array of interferometric modulators includes applying particular waveforms to certain portions of the array, and inspecting the optical output of the array. This inspection may be done visually, or it may be automated, through the use oft for example, a CCD camera connected to a processor configured to analyze the images from the camera. As used herein, the term visual inspection is intended to refer to either inspection by a technician, or automated inspection of the optical output of an array by a system configured to capture an image of the optical output and analyze that image.

Figure 8:
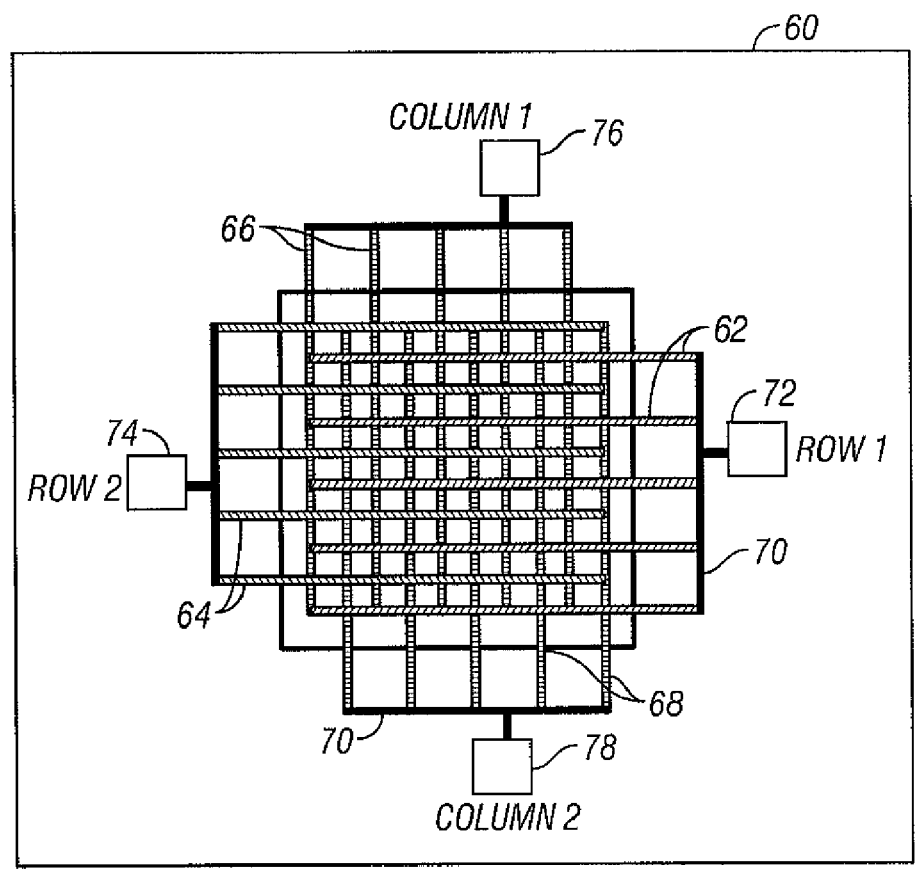
FIG. 8 schematically illustrates an array of interferometric modulators configured for testing.

FIG. 8 schematically illustrates an array 60 of interferometric modulators (such as those depicted in FIGS. 1 and 7A-75) configured for visual inspection. It can be seen that the array 60 comprises multiple row electrodes 62, 64 as well as multiple column electrodes 66, 68. A first row test pad 72 is in connection with a first set of the row electrodes 62 via a buss bar 70, and a second row test pad 74 is in communication with a second set of row electrodes via another buss bar 70. The row test pads 72, 74 and the buss bars 70 permit a single signal to be applied to each of a set of row electrodes via a single lead. Advantageously, as depicted in the figure, none of the row electrodes connected to a given test pad are adjacent to one another, and thus, row electrodes 62 comprise a set of electrodes containing every second row electrode, and similarly, the row electrodes 64 comprise the remaining electrodes. Similarly, column test pad 76 is connected via a buss bar 70 to a group of column electrodes 66, and a second column test pad 78 is connected to a second group of column electrodes 68. In one embodiment, the row electrodes comprise electrodes deposited on an underlying substrate (for example, as a component in the optical stack 16 of, e.g., FIG. 7A), and the column electrodes comprise electrodes spaced apart from the substrate by an interferometric cavity (for example, as a component in the movable reflective layer 14 of, e.g., FIG. 7A). Thus, although the column electrodes 66, 68 overlie the row electrodes 62, 64, they are not electrically connected to one another. It will also be understood that various layers may be deposited between the row electrodes 62, 64, such that the row electrodes are not deposited directly on the substrate, but are instead supported by the substrate but actually in contact with one or more intervening layers.

In the depicted embodiment, the test pads comprise a layer of conductive material deposited on the substrate, and in connection with the buss bars 70. Advantageously, these test pads are formed at the same time and from the same material as the buss bars and the row and column electrodes, however, these components may be formed in distinct sets. The test pads may also be significantly larger than the buss bars and the row and column electrodes, in order to facilitate connections between the test pads and other testing equipment, particularly signal generators. However, in alternate embodiments, the test pads may be of a similar thickness as the rest of the electrodes. In yet further embodiments, no test pads at all are provided, and connections are be made directly, e.g., to the buss bars. In alternate embodiments, each column and row may be probed individually, and any desired bussing may be done externally.

It will be understood that in certain embodiments, there may be additional test pads connected to further sets of electrodes. In particular, in one embodiment which will be discussed in greater detail below, a third column test pad is provided, which is in electrical communication with a third set of column electrodes. In one embodiment, each set of columns comprises every third column electrode. The three sets of column electrodes may advantageously correspond to columns of interferometric modulators configured to reflect different colors, such as red, green, and blue columns. It will also be understood that while the term row electrode is used primarily herein to refer to the electrodes located within the optical stack 16 and the term column electrode is used primarily herein to refer to electrodes such as those located within the movable reflective layer 14 (see, e.g. FIG. 7A), the row and column designations are arbitrary, and may be reversed.

Figure 9:
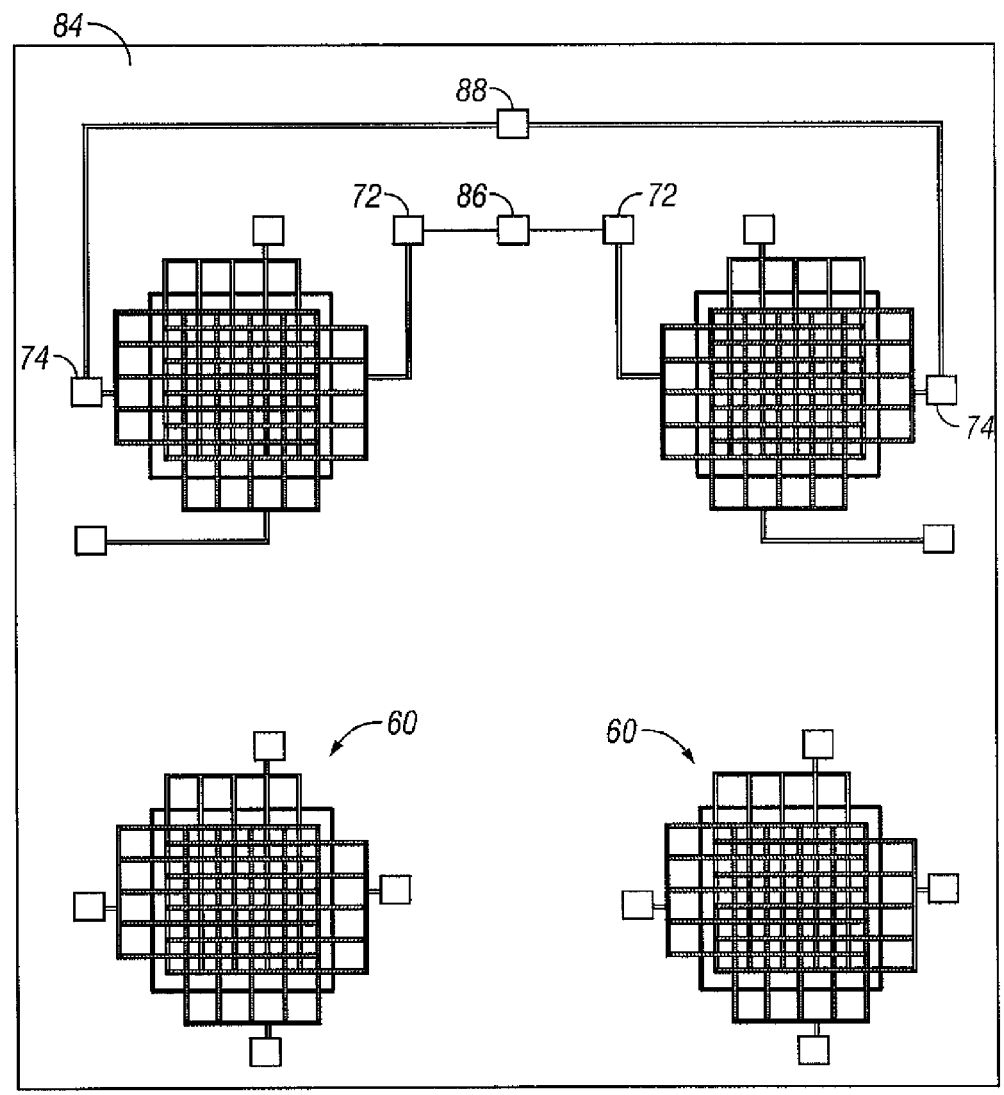
FIG. 9 schematically illustrates a substrate on which multiple arrays of interferometric modulators are configured for testing.

In certain embodiments, multiple arrays of interferometric modulators 60 may be fabricated on a single substrate 84, as seen in FIG. 9. These arrays may be visually inspected prior to scribing of the substrate to separate the arrays 60, in order to identify defective arrays. Furthermore, as depicted in FIG. 9, additional connections may be made between certain test pads in order to reduce the number of probes required to apply the desired signals to each of the arrays. For instance, in embodiments in which the row test pads for each array 60 will receive the same signals, two shared test pads 86, 88 in communication with the test pads in each of the arrays (e.g., one test pad 86 in communication with the test pads 72 and the other test pad 88 in communication with the test pads 74) may be provided. Any desired amount of commonality between the signals applied to each array may be provided through such shared test pads.

Figure 10:
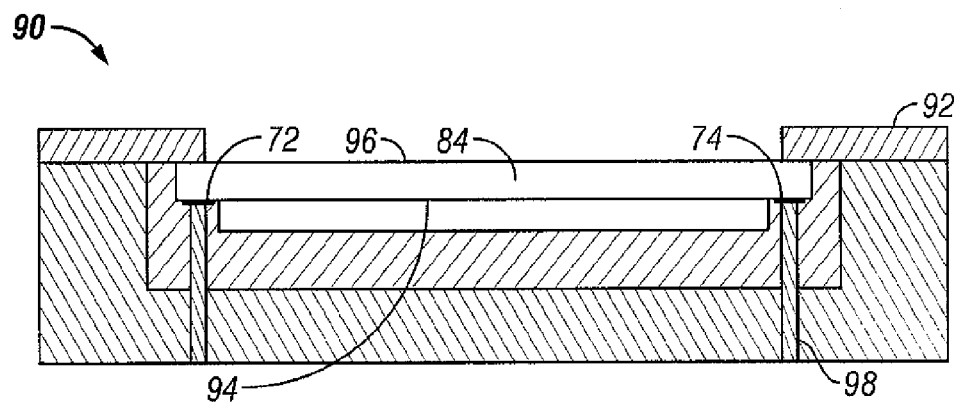
FIG. 10 schematically illustrates a cross-section of an embodiment of a probe mount which can be used to provide electrical connection to an array of interferometric modulators during testing.

In one embodiment, a probe mount 90 (FIG. 10) is provided to facilitate the connections between the signal generators and the arrays. FIG. 10 depicts a schematic cross-section of the probe mount 90. The substrate 84, on which one or more arrays 60 of interferometric modulators have been fabricated is placed within the probe mount 90, and secured by a clamp 92. The substrate 84 is oriented such that the process side 94, on which the arrays 60 and test pads such as test pads 72 and 74 are located, faces downward, and the viewer side 96, through which the arrays 60 are viewable, faces upward. Connections to the test pads such as pads 72, 74 on the substrate may be made though spring-loaded pins 98 (also referred to as pogo pins), which are biased against the substrate 84 in order to ensure the desired quality of connection. Connections between the pins 98 and a signal generator (not shown) may be made elsewhere in the probe mount.

Figure 11:
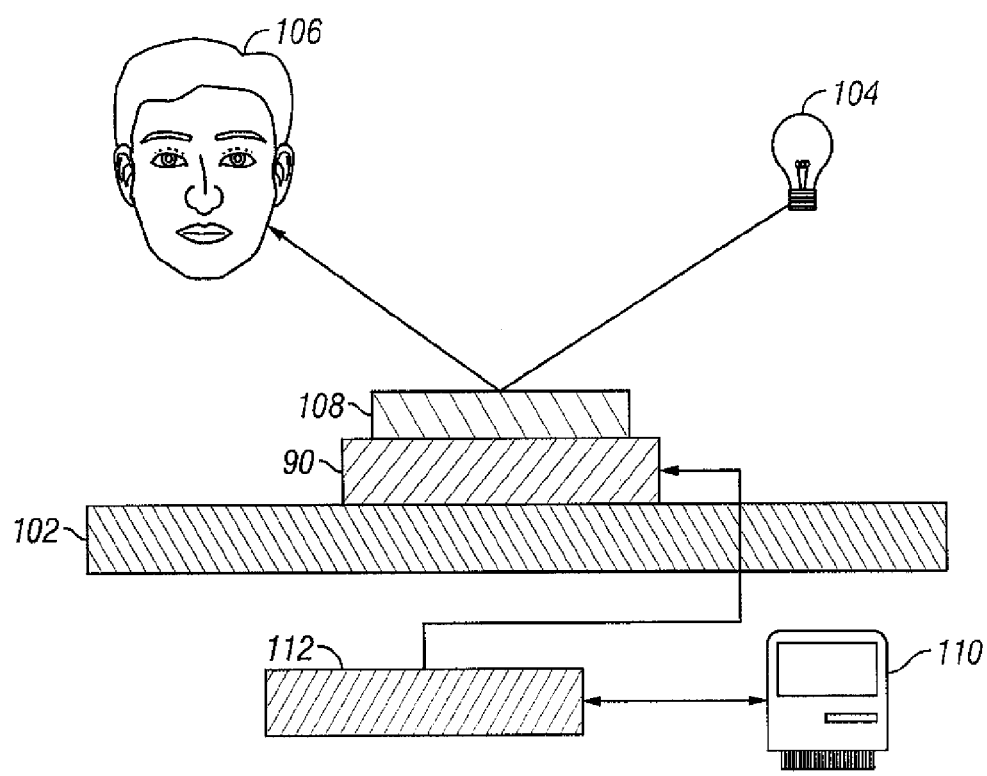
FIG. 11 schematically illustrates a system for testing an array of interferometric modulators.

FIG. 11 schematically depicts a system for visual inspection of an array of interferometric modulator. As discussed with respect to FIG. 10, a substrate containing one or more arrays of interferometric modulators is placed within the probe mount 90, which may rest on a supporting surface 102. A light source 104, which in certain embodiments emits a continuous spectrum of light, illuminates the array within the probe mount 90. An operator 106, which may be a technician or an automated system (e.g., including a CCD camera), analyzes the optical output of the array in order to identify defects in the array. In further embodiments, a diffuser layer 108 may be placed on the viewer side 96 of the substrate 84. The use of a diffuser layer 108 facilitates the visual inspection of the interferometric modulator arrays, as direct reflections off of the transparent substrate from the light source 104 or other light sources interfere with the detection of small defects in the array. Advantageously, the diffuser layer 108 is not secured to the substrate 84 until after inspection of the underlying array 60 has been completed, as the permanent application of a diffuser layer 102 adds to the cost of fabrication, and the array 60 may be disposed if it is found to be defective. Although the diffuser layer 108 is depicted as being in contact with the substrate 84, the diffuser layer may be spaced apart from the substrate somewhat, so long as the diffuser layer is adjacent the array and sufficiently close to produce the desired optical effect.

Still with respect to FIG. 11, the signals to be applied to the various test pads are generated by a signal generator, which in this embodiment is a control computer 110. A switch box 112 in communication with the control computer 110 and the probe mount 90 permits the switching of the applied signals from one test pad to another, as necessary.

One method of testing an array 60 includes observing the array 60 during continuous switching of each of the individual modulator elements between an actuated and an unactuated state. One such embodiment is described with respect to the array 60 of FIG. 8. In this embodiment, this may be achieved by grounding the row test pads 72, 74. A signal is then applied to the column test pads 76, 78 which alternately actuates and unactuates each of the interferometric modulator elements. FIG. 12A depicts an exemplary waveform 120 which can be applied to both of the column test pads 76, 78 in order to achieve the desired display pattern. Because the waveforms applied to column test pads 76 and the waveform applied to column test pads 78 are identical and synchronized, each modulator element will move between actuated states and unactuated states at the same time.

Still with respect to FIG. 12A, it can be seen the waveform 120 has several characteristic parameters. The initial voltage applied, prior to and between the peaks 122 and the troughs 124, may be within the hysteresis window of the interferometric modulator elements to be actuated, so as to not result in a change in the states of the interferometric modulators for a time 126, referred to has a hold time. Specifically, the initial voltage is higher than the release voltage 121 but lower than the actuation voltage 123. The pulses 122 and 124, which in this embodiment take the form of peaks and troughs, are collectively referred to herein as signals, although it will be understood that the shape of these signals need not be as depicted in the exemplary waveforms. This hold time 126 determines the rate at which the display will blink between dark and light states. The height 130 of the peaks may be sufficient to result in the applied voltage exceeding the hysteresis window of the modulator element, driving the elements to an actuated state. Similarly, the height 132 of the trough may be sufficient to apply a voltage below the hysteresis window, relaxing the interferometric modulator elements. The length 128 of the pulses 124 and 122, may be longer than the response time of the interferometric modulators in order to be sufficient to result in change of state of the interferometric modulator elements. Thus, at state 136, the applied voltage may have no effect on the state of the elements in the array 60. At state 138, after the first pulse 124, all modulators have been placed in an unactuated state. At state 140, after the second pulse 122, all modulators have been placed in an actuated state.

Figure 14A:
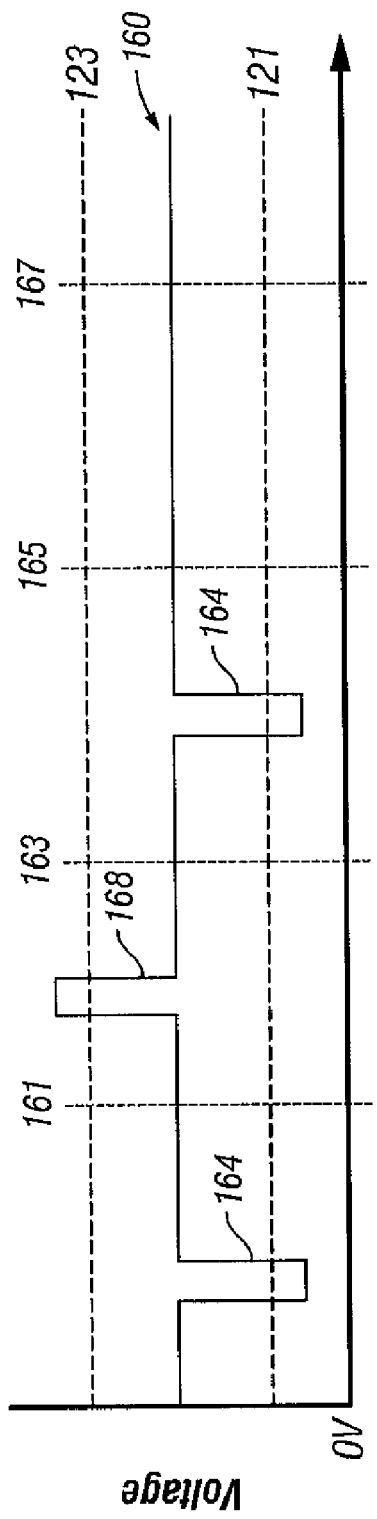
FIG. 14 illustrates alternate exemplary waveforms which may be applied to portions of an array of interferometric modulators to generate a desired display pattern during testing.
Figure 14B:
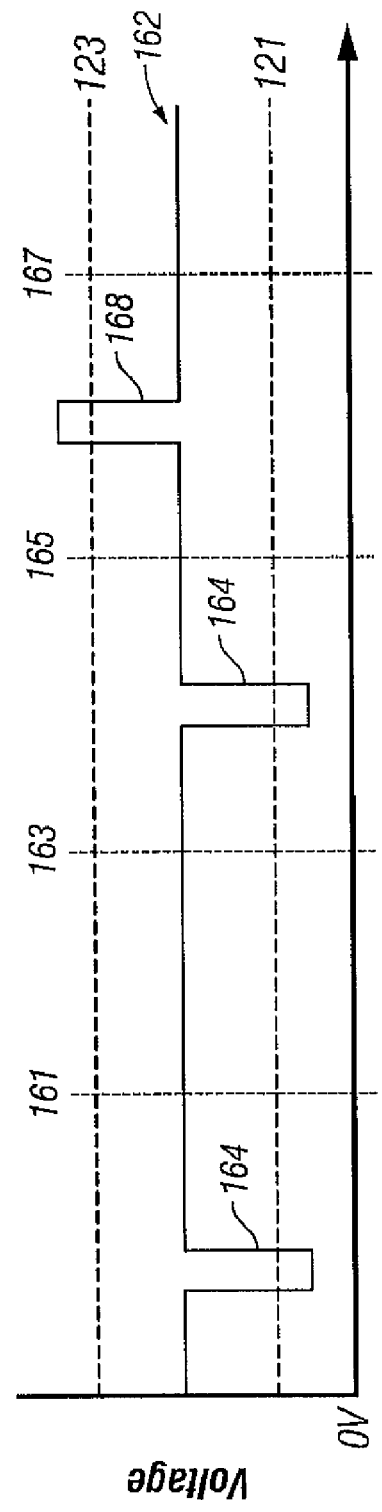

Because the exemplary interferometric modulator elements will maintain their display states, signals such as pulse 122 and 124 may be applied between the row and column electrodes so as to place the modulator elements in desired states. However, these signals need not be maintained for the duration of the inspection process, as can be seen in the waveforms of FIGS. 14A and 14B. The response time of the modulator elements, which controls the length 128 of the pulse signals 122 and 124, may be on the order of 100 μs, although it will be understood that the response time may vary significantly depending on the design of the modulator elements. The hold time 126, however, may be as long as is necessary to inspect the array. In certain embodiments, the application of the next signal in the waveforms may be controlled by an operator, who can advance the array to the next state once the current state has been inspected (e.g., by pressing a button on the control computer). The variable length of the hold time 126 also facilitates automated inspection of the array, as an image of the array need not be recorded during application of the signal, as would be required in the testing of other displays, such as LCDs. Rather, the image may be recorded at any point after application of a set of signals which places the array in a desired state.

FIG. 12B depicts an alternate waveform which may be used to provide the same display pattern. As can be seen, although the applied voltage alternates between positive and negative, the absolute value remains within the hysteresis window except at pulses 124 and 122, where the voltage remains outside the outside the hysteresis window for longer than the actuation time of the modulators, resulting in a change in the state of the modulators. A wide variety of other waveforms can be utilized to produce the desired voltages (e.g., actuation voltages or release voltages) at particular modulator elements. It will be understood that for the purposes of the embodiments discussed herein, any signals which produce the desired voltages at particular modulator elements are to be regarded as equivalent and within the scope of the embodiments discussed herein. Furthermore, it will be understood that the exemplary waveforms depicted herein are not to scale. The hold time 126, for example, may be significantly longer than the signal length 128. In this long hold time embodiment, the number of square wave pulses in waveform 120' (FIG. 12B) between pulse 124 and pulse 122 may be much larger than the number shown in FIG. 12B.

In certain embodiments, particularly in polychrome arrays of interferometric modulators, not all of the interferometric modulators will have the same actuation voltage. In one such embodiment, one-third of the columns may contain red interferometric modulator elements, one-third may contain green, and the final third may contain blue. Three test pads may be provided which connect all red columns, all green columns, and all blue columns, respectively. As the color reflected by a modulator element is dependent on the height of the interferometric cavity 19 (see FIG. 1), and the actuation voltage of an interferometric modulator may also be dependent on the height of the cavity 19, modulators which reflect different colors will typically have different actuation voltages.

In such an embodiment, if there is overlap between the hysteresis windows of all three elements, a single waveform can be provided to each of the three column test pads which will simultaneously actuate and relax all three types of interferometric modulator elements. However, it may be preferable to apply a distinct waveform to each of the three column test pads. Such waveforms may have identical hold times 126, as well as identical pulse times 128, differing only in the initial voltage and heights of the pulses. In alternate embodiments, the signals may be slightly staggered, particularly if the time 126 between pulses is long relative to the pulse time.

FIGS. 13A-13F depicts three different arrays in both unactuated and actuated states corresponding to states 138 and 140, respectively, of FIG. 12A.

Figure 13A:
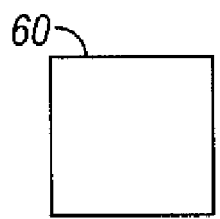
FIGS. 13A through 13F depict three exemplary arrays of interferometric modulators shown in both bright and dark states, illustrating potential defects.

FIG. 13A depicts one exemplary array 60 in a bright (in this case unactuated) state, corresponding to state 138 of FIG. 12A. FIG. 13B depicts the same array 60 in a dark (in this case actuated) state corresponding to state 140. As can be seen in both figures, the array 60 has no defects that are visible in either state.

Figure 13C:
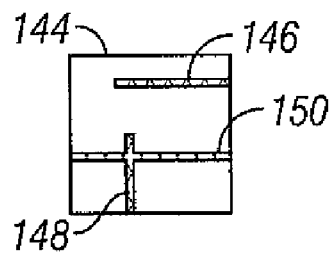

FIG. 13C depicts a second array 144 in a bright state, corresponding to state 138. FIG. 13D depicts the same array 144 in a dark state, corresponding to state 140. As can be seen in both figures, portions of row 146 and column 148 are a different shade than the surrounding pixels, indicating that modulator elements in row 146 and column 148 were not actuatued/unactuated along with the surrounding pixels. Defects such as row 146 and column 148 may indicate an intra-row or intra-column open, meaning that the conductive pathway does not continue uninterrupted for the entire row or column. As can also be seen in both figures, all of row 150 is a different shade from the surrounding pixels. Such full-row defects may indicate a row to column short, which can cause an entire row or column to fail.

Figure 13E:
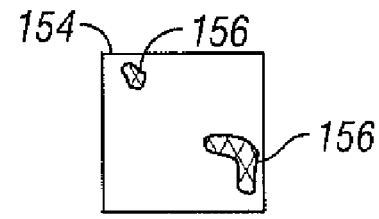
Figure 13B:
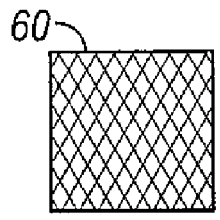
Figure 13D:
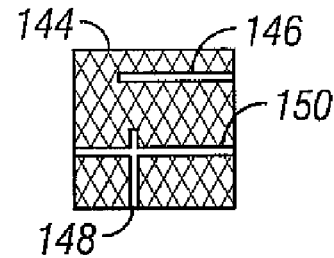
Figure 13F:
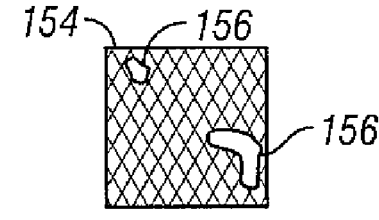

FIG. 13E depicts a third array 154 in both a bright state, corresponding to state 138. FIG. 13F depicts the array 154 in a dark state, corresponding to state 140. As can be seen in both figures, spots 156 having a different brightness than the surrounding pixels are visible, indicating the presence of "mura" defects (for example, the depicted amorphous areas of contrasting optical output) the in the array. If any defects, such as the row or column defects 146, 158, 150 or mura defects 156 are visible in an array, the array may be identified as defective, and be discarded or otherwise dealt with.

Because the optical output of the interferometric modulator array is analyzed in this method and the alternate methods discussed below, it will be understood that not only is it possible to easily identify those arrays having such defect, but it is possible to identify the locations of these defects. This information regarding the location and form of the defects may provide valuable information regarding problems with, e.g., the fabrication process, if certain defects frequently occur in the same locations in the arrays.

Another method of testing involves selectively actuating or unactuating only a portion of the rows or columns in an array, and observing the optical output of the array. In one embodiment, this involves placing all elements in a modulator array in a known state (e.g., either a bright state or a dark state), and then placing some portion of the modulators in the opposite state. The modulators are then all placed in the original known state, and another portion of the modulators are placed in the opposite state.

FIGS. 14A and 14B depict exemplary waveforms which can be used to create the desired display patterns in the array 60 of FIG. 8. In one embodiment, the row test pads 72, 74 may be grounded, a first waveform 160 (FIG. 14A) is applied to column test pad 76, and a second waveform 162 (FIG. 14B) is applied to column test pad 78. Both waveforms 160, 162 include a pulse 164 at the beginning of the waveform, in order to place all of the modulators in an unactuated state 161, in this case a 100% bright state. Next, waveform 160 includes a pulse 168, which places the group of columns 66 in an actuated, or dark state. No corresponding pulse is applied via the second waveform 162, and thus the columns 68 remain in a bright state. The array is thus placed in a partially dark state 163. Next, both waveforms contain a pulse 164, returning the modulators to a all-bright state 165. Finally, the waveform 162 includes a pulse 168, placing the columns 68 in a dark state while the columns 66 remain in a bright state. Thus, the array is placed in a partially dark state 167.

Thus, in one embodiment, a method is provided which drives an entire array to a bright state, drives some portion of the array to a dark state, drives the entire array to a bright state, and then drives some second portion to a dark state. In a particular embodiment, the first portion of the array driven to the dark state comprises every other column, and the second portion comprises the remaining columns. In alternate embodiments, the array may be driven to a dark state, and portions may then selectively be driven to a light state. It will be understood that while the above waveforms are discussed with respect to selective actuation of columns, a method for alternating columns may be provided by grounding the column test pads 76, 78 and applying the waveforms 160,162 to the row test pads 72 and 74, respectively.

Figure 15A:
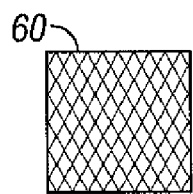
FIGS. 15A through 15F depict three exemplary arrays of interferometric modulators shown in both bright and dark states, illustrating potential defects.
Figure 15C:
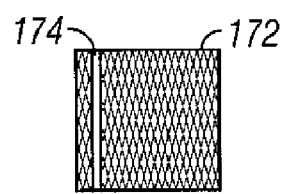
Figure 15E:
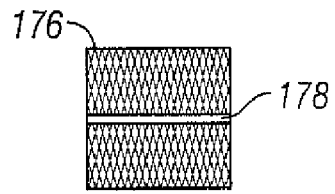
Figure 15B:
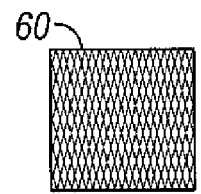

FIGS. 15A-15F depicts arrays of interferometric modulators in various states of actuation. In FIG. 15A, an array 60 is depicted in an all-bright state, such as state 161 or state 165. In FIG. 15B, the array 60 is depicted in a state in which some portion of the rows or columns have been driven to a dark state, such as state 163 or state 167. As can be seen in FIGS. 15A and 15B, no defects are visible in either state.

Figure 15D:
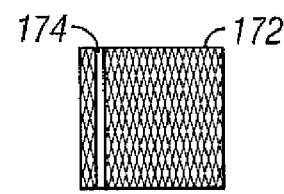
Figure 15F:
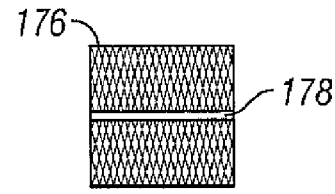

FIG. 15C depicts an array 172 in the half-dark state 163, in which certain columns (such as columns 62) have been driven dark. FIG. 15D depicts the same array 172 in the half-dark state 167 in which the previously dark columns have been driven light, and the remaining columns (such as columns 64) are driven dark. As can be seen in both states, a column area 174 differs in brightness from the surrounding columns. In an embodiment in which alternating columns are being driven, a defect in area 174 may be indicative of a column-to-column short. FIG. 15E depicts an array 176 in a half-dark state 163, in which certain rows (such as rows 66) have been driven dark, and FIG. 15F depicts the same array 176 in a half-dark state 167, in which the other rows (such as rows 68) have been driven dark. As can be seen, row area 178 differs in brightness from the surrounding pixels, indicating a defect such as a row-to-row short.

In further embodiments, this method may be adapted to drive more than two sets of columns or rows individually. For instance, in another embodiment, three groups of columns may exist, each set containing nonadjacent columns of interferometric modulators which reflect light of a particular color. The entire array may be first driven to a known state (in this case a bright state). Next, one of the three sets is driven to the opposite state, and the entire array is then returned to the known state. This is repeated for the remaining two sets.

FIG. 16 depicts exemplary waveforms which can be used in order to selectively drive three sets of columns in an interferometric modulator display. In a certain embodiment, one set corresponds to blue columns, a second set corresponds to green columns, and the third set corresponds to red columns. Each set is provided with a corresponding test pad. In this embodiment, the row test pads are grounded, waveform 182 is applied to the blue test pad, waveform 184 is applied to the green test pad, and waveform 186 is applied to the red test pad. It can be seen that each of the waveforms comprises a pulse 164, which places the entire array in a bright position, which may be a white state 161. Next. waveforms 182 and 184 comprise a pulse 168, which drives the blue and green columns to a dark state, so that only the red columns are bright, placing the array in a red state 181. As discussed with respect to the arrays of FIG. 15, the array can now be inspected to determine the presence and location of defects such as column-to-column shorts. Next, all waveforms contain a pulse 164, which resets the entire array to a bright state 161, followed by a pulse 168 in blue waveform 182 and red waveform 186, driving those columns to a dark state so that only green columns are bright, placing the array in a green state 183. Subsequent pulse 164 reset the array to a bright state 161, and pulse 168 in the green waveform 184 and red waveform 186 drive those columns dark, so that only the blue columns are bright, placing the array in a blue state 185.

Alternately, a polychrome array may be sequentially driven to states in which the columns of multiple colors are bright. For example, with respect to the RGB array discussed above, rather than driving the array to a red state, a green state and a blue state, the array could be driven, e.g., to a cyan state, a yellow state, and a magenta state. In one embodiment, this can be accomplished by driving the array to a bright state, and then selectively driving only the columns of one color to a dark state. This process is then repeated for the other colors. Such a display pattern may be useful for identifying the locations of particular defect. In addition, all colors can be driven to a black state, as discussed above.

Figure 17:
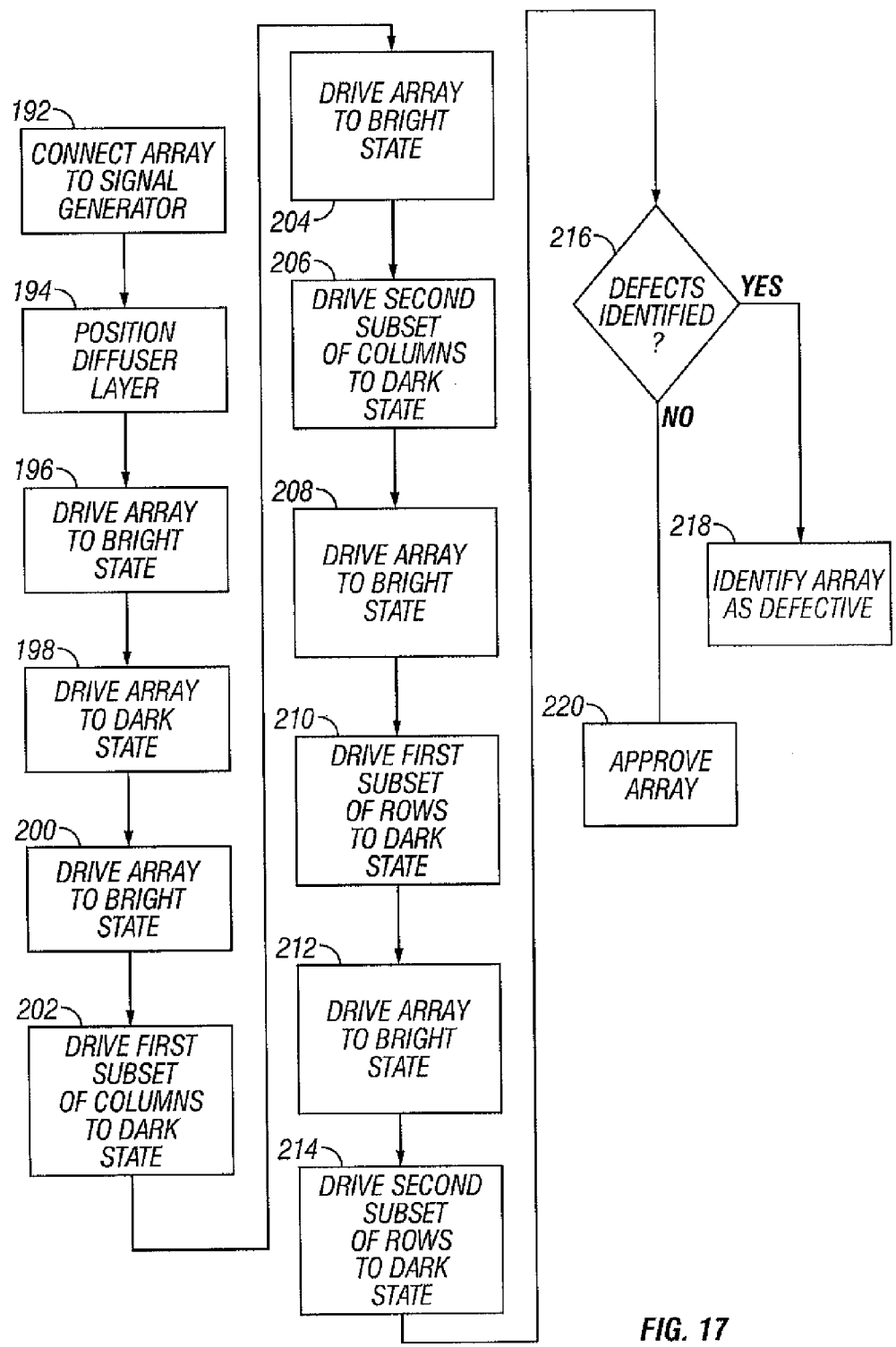
FIG. 17 is a flow chart illustrating an exemplary method for testing an array of interferometric modulators.

In a further embodiment, a method 190 for testing an array of interferometric modulators such as the array 60 of FIG. 8 comprises both of the methods discussed above, in order to provide a thorough inspection of the array 60. An exemplary flowchart illustrating this method 190 is depicted in FIG. 17. It will be understood, however, that depending on the embodiment, additional stages can be added, others removed, and the order of the steps may be rearranged. At stage 192, connections are made between an array 60 and one or more signal generators. These connections may be made, for instance, by placing the array 60 in a probe mount such as probe mount 90 of FIG. 10. The probe mount 90 may then be connected to a switch box 112 and control computer 110, as depicted in FIG. 11. At stage 194, a diffuser layer 108 may be placed between the inspector (or CCD camera, in certain embodiments), and the substrate 84 on which the array 60 is located. At some point prior to inspection of the array (not depicted in the flow chart), a light source may be provided to illuminate the array.

In stage 196, the array is driven to a known state, which in this embodiment is an all-bright state. The array may be observed at this time for defects. This inspection may occur after each of the changes in the state of the interferometric modulator, but it will be understood that inspections need not occur after every stage, particularly after the array has been driven to an all bright stage multiple times. At stage 198, the array is driven to an all-dark state. Thus, stages 196 and 198 comprise a portion of the display pattern generated by the waveforms of FIGS. 12A and 12B. Inspection of the array preferably occurs at this point, Then, at stage 200, the array is driven back to an all bright state. Next, at stage 202, the rows are grounded, and a first subset of the columns (e.g., a set of alternating columns) are driven to a dark state, and the array is again preferably inspected. At stage 204, the array is driven back to an all bright state, and at stage 206 a second subset of the columns (e.g., those alternating columns which were not driven dark at stage 202) are driven dark, and the array is preferably inspected.

At stage 208, the array is driven back to an all bright state once again. Then, at stage 210, the columns are grounded, a first subset of the rows (e.g., a set of alternating rows) are driven to an all dark state, and the array is inspected. At stage 212, the array is driven back to an all bright state, and at stage 214, a second subset of rows are driven dark (e.g., those alternating rows which were not driven dark at stage 202), and the array is again preferably inspected.

At stage 216, a determination is made as to whether any defects were identified during the process 190. If so, the process moves to a state 218 wherein the array 60 is identified as defective, discarded, or otherwise dealt with (e.g., set aside for further testing). It no defects were identified, the process moves to a state 220 where the array 60 is approved.

It will be understood that certain portions of this process may take place in any order, and that not all steps in the process above are required. In one embodiment, an array may be identified as defective very early on in the process (e.g. at state 196 or 198). In such an embodiment, the process may move immediately to a state 218, in which the array is identified as defective. In another embodiment, the the stages 196-216 of the process 190 may be repeated more than once prior to making a determination as to whether any defects are present. Smaller portions of the process 190 may also be repeated at any time. In an embodiment in which multiple arrays 60 located on a substrate 84 are simultaneously tested, this advantageously permits the inspection of one array while other arrays are cycling through this display pattern. The inspection of multiple arrays at one time may facilitate the identification of defects in those arrays, as comparisons can easily be made.

As noted above, while the method 190 of FIG. 17 is discussed with respect to bright and dark states, in alternate embodiments, the bright and dark states may be reversed such that the array is generally driven dark between tests and certain rows or columns are selectively actuated to bright states. So long as the array is first placed in a known state, and then subsequently selectively actuated to the opposite state (e.g., from bright to dark or vice versa), the method 190 will facilitate the identification of defects. In certain embodiments of interferometric modulators, neither the actuated state nor the unactuated state is a dark state. For instance, the actuated state may reflect substantially white light, rather than being a dark state. Even in such an embodiment, the method 190 will facilitate the identification of defects, as discrepancies from the surrounding pixel will still be identifiable. Similarly, the waveforms of FIGS. 12A, 12B, 14, and 16 place the array initially in a bright state before selectively actuating portions to a dark state, but it will be understood that they may be modified to place it in an alternate known state (e.g., a dark state) before selectively actuating portions of the display.

Other inspection methods discussed within this application may be also incorporated into the process 190, and modifications may be made to any of the steps. In particular, in inspecting a color array, it will be desirable to selectively actuate a third subset of columns or rows corresponding to the third color, and to inspect the array at that point.

In yet another embodiment, an array is driven bright, and then some subset of both the columns and the rows are driven dark. In one particular embodiment which can be applied to the array 60 of FIG. 8, the elements are first driven to a bright state, and then half of the elements are driven to a dark state in a checkerboard pattern. The elements are then driven back to a bright state, and the other elements in the array (e.g., those which remained bright when the others were driven dark) are now driven dark in an inverse of the previous checkerboard pattern. Any variations in the expected checkerboard pattern are indicative of defects in the array, particularly defects which may be caused by leakage between adjacent elements, or adjacent lines. If the defect persists when the array is driven to both the checkerboard pattern and the inverse, the defect may be indicative of an adjacent line defect.

FIG. 15A depicts a stylized 4×4 array 230 of interferometric modulators, which may be, for example, a subsection of the array 60 of FIG. 8. As can be seen, a test pad 232 is connected to a first set of columns 234, and a test pad 236 is connected to a second set of columns 238. A test pad 242 is connected to a first set of rows 244, and a test pad 246 is connected to a second set of rows 248. When waveforms are applied via the test pads, it will be understood that the modulators in the array will be driven to a state wherein a single 2×2 pattern is repeated throughout the array. This 2×2 pattern will correspond to the states of exemplary interferometric modulator elements 252, 254, 256, and 258.

Figure 18A:
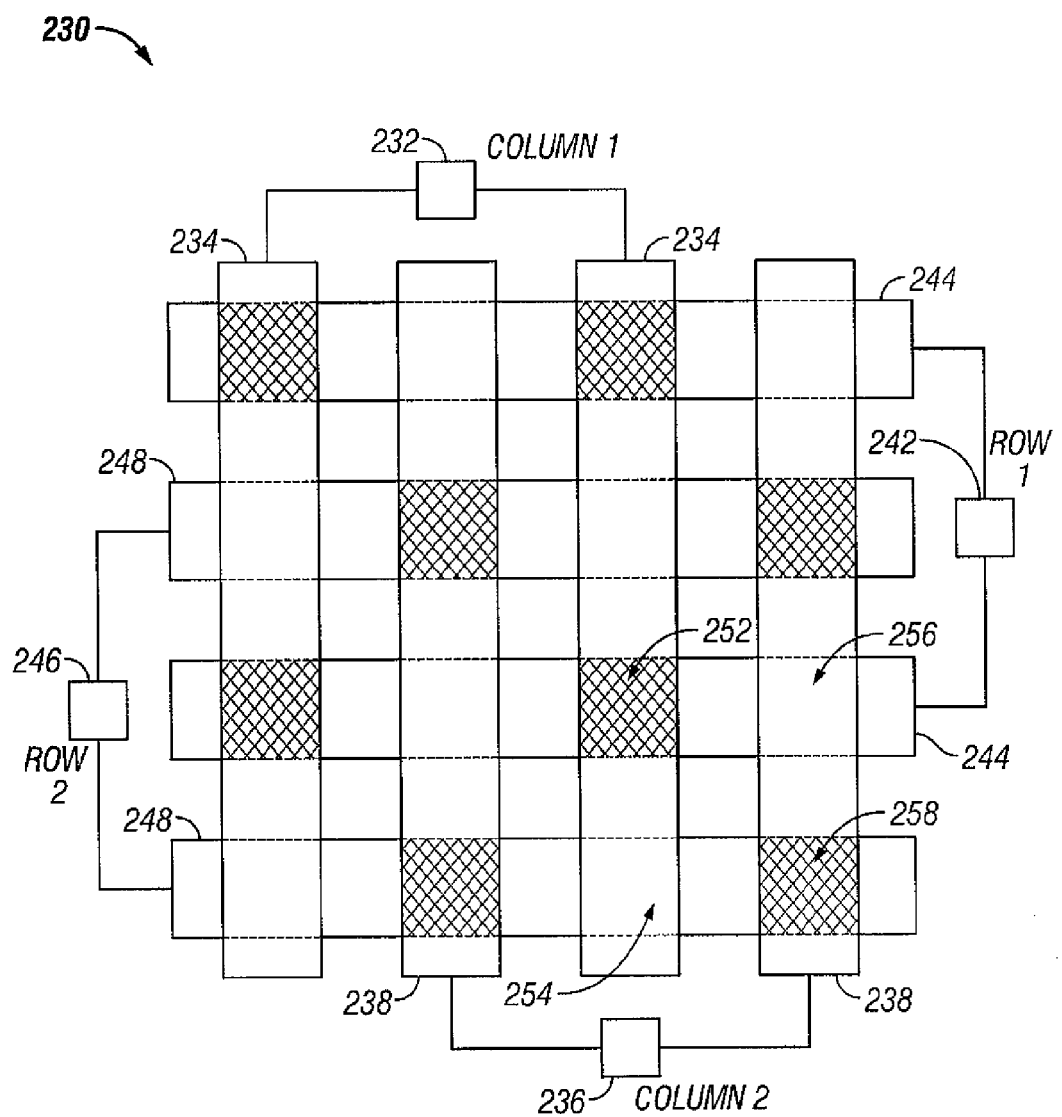
FIG. 18A schematically depicts a 4×4 array of interferometric modulators in which certain modulator elements have been driven dark in a checkerboard pattern.
Figure 18B:
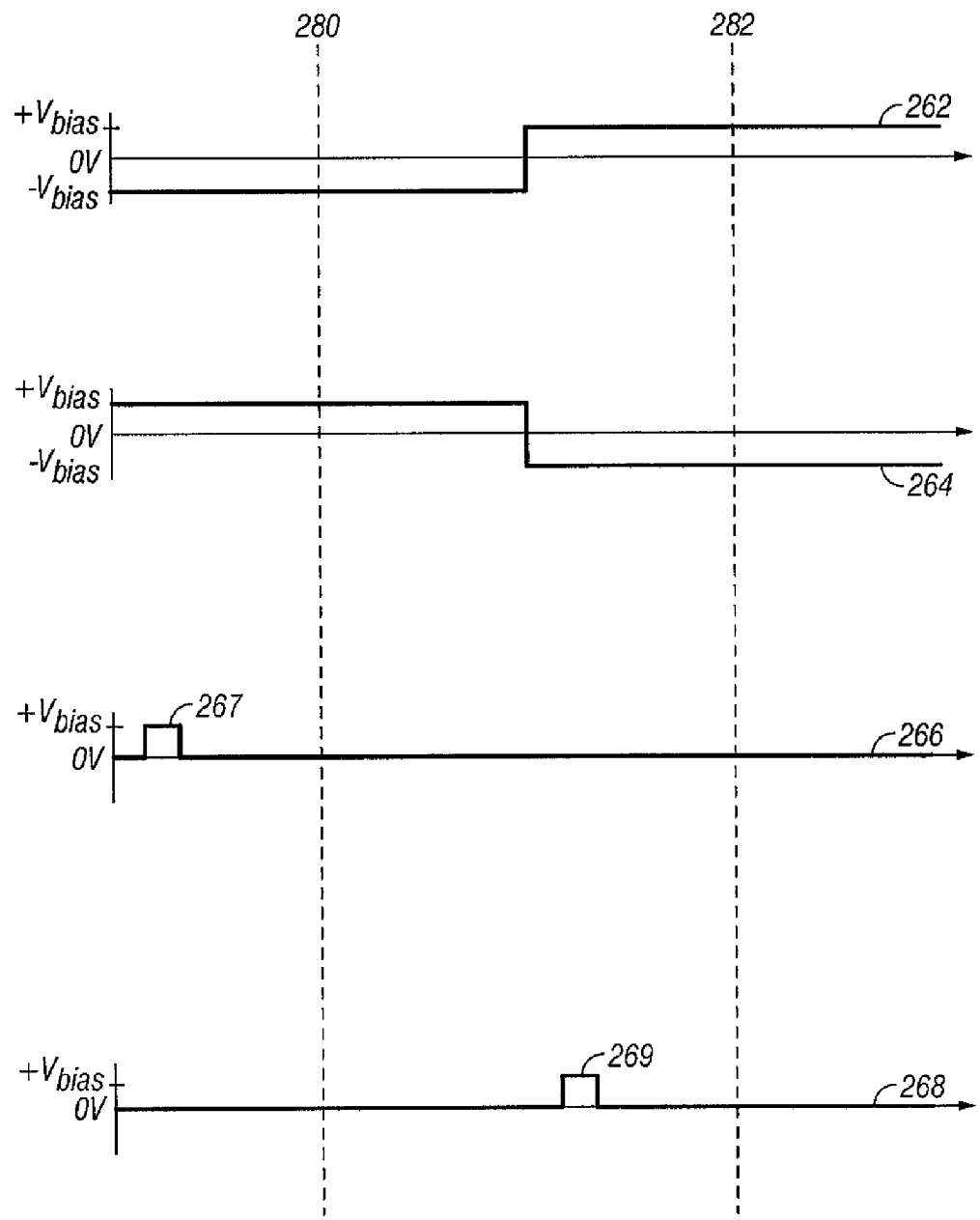
FIG. 18B depicts a series of waveforms which may be applied to the array of FIG. 18A to produce the checkerboard pattern of FIG. 18A, as well as the resulting pixel voltages at each of four exemplary pixels.
Figure 18B:
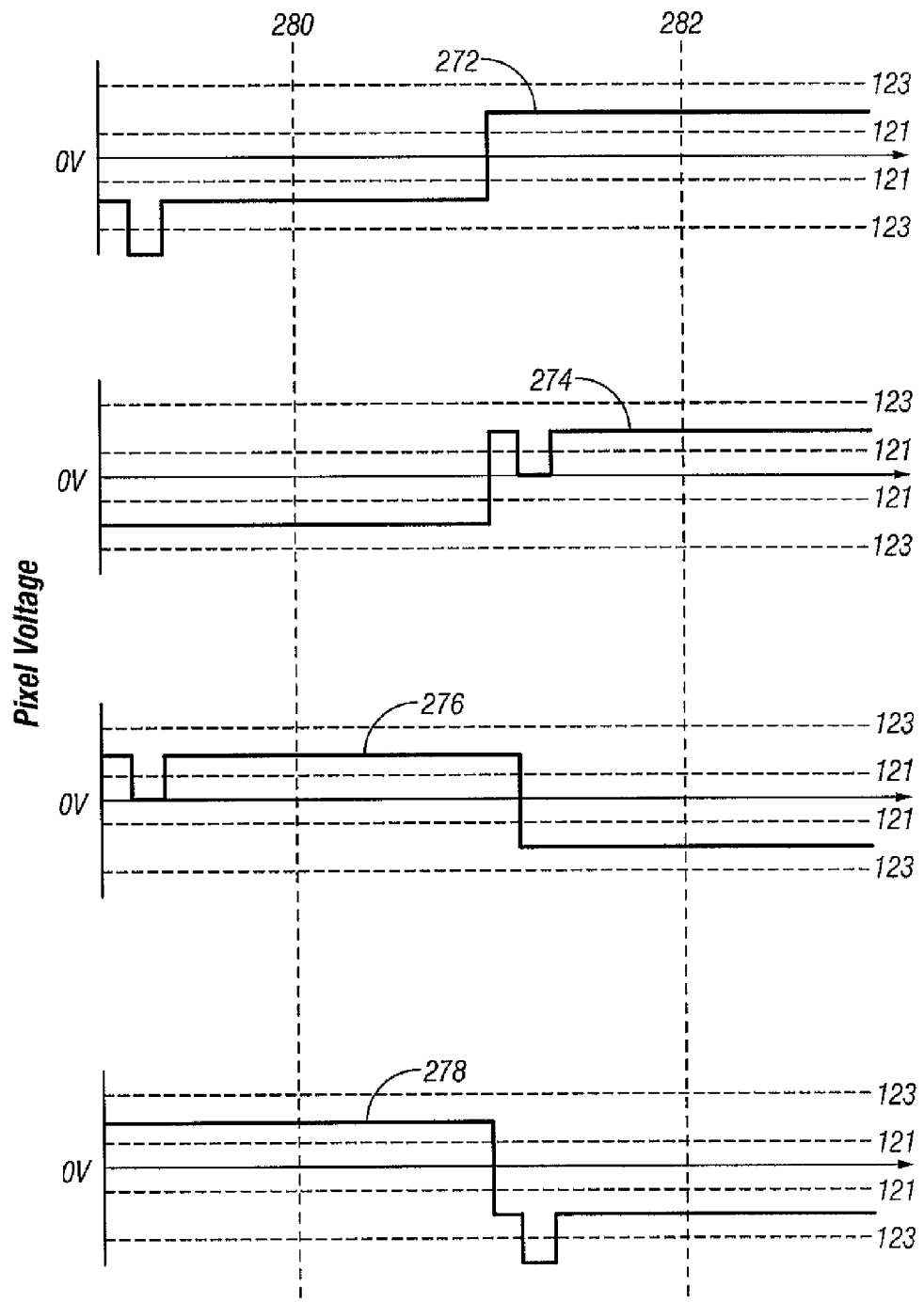

FIG. 18B depicts a series of waveforms which may be applied to the test pads 232, 236, 242, and 246 of array 230 in order to generate a checkerboard pattern in the array 230. In one embodiment, the waveform 262 is applied to test pad 232, waveform 264 is applied to test pad 236, waveform 266 is applied to test pad 242 and waveform 268 is applied to test pad 246. The application of these waveforms results in particular voltages being applied to the individual interferometric modulator elements. In one embodiment, the plot 272 depicts the voltage at exemplary element 252, plot 274 depicts the voltage at element 254, plot 276 represents the voltage at exemplary element 256, and plot 278 depicts the voltage at exemplary element 258.

In FIG. 18B, it can be seen that the waveform 262 switches between a value of $+V_{bias}$ and $-V_{bias}$, where $V_{bias}$ is some voltage value between the actuation voltage 123 and the release voltage 121 of a modulator element. Similarly, the waveform 264 switched between $-V_{bias}$ and $+V_{bias}$. Waveform 266, which is at 0V for most of the waveform, contains a pulse 267 at which the voltage increases to $+V_{bias}$. Similarly, waveform 268 comprises a pulse 269

The voltage 272 applied to exemplary element 252 is the difference between the waveform 262 applied to the corresponding electrode column and waveform 266 applied to the row electrode. Initially, the pixel voltage 272 is at $-V_{bias}$, between the release voltage 121 and the actuation voltage 123 of the element, as discussed above. It can be seen that when the pulse signal 267 occurs in waveform 266, the voltage difference (e.g., $-2V_{bias}$) is sufficient to exceed the actuation voltage 123 of the modulator element, placing the element 252 in an actuated state. The voltage then returns to a value of $-V_{bias}$, and then switches to a value of $+V_{bias}$, but the modulator element does not change its state when the voltage switches, as the release voltage was not applied for any significant period of time during the polarity switch. Similarly, voltage plot 278 represents the difference between the waveform 262 and the waveform 268, showing that during pulse signal 269 in the row waveform 268 is the pixel voltage low enough to place element 258 in an actuated state, as during the rest of the waveform the element 258 remains unaffected by the voltage, the pixel voltage is either at $+V_{bias}$ or $-V_{bias}$, within the hysteresis window.

Similarly, voltage plot 274, which depicts the voltage differential between the waveform 262 and the waveform 268, shows that at pulse 269 of waveform 268, the voltage differential between waveforms 262 and 268 drops to a level below the release voltage 121, driving the element 254 to an unactuated, or released, state. Similarly, as can be seen in voltage plot 276, the voltage difference between waveforms 264 and 266 drops to a level below the release voltage 121 of element 276 at the time the pulse signal 267 appears in the waveform 266, placing the element 256 in a released state.

Thus, at a state 280 after pulse 267 of waveform 266, element 252 has been placed in an actuated state, and element 256 has been placed in an unactuated state. Elements 254 and 158 remain in the unknown states they were at prior to pulse 267, as they are unaffected by the pulse and the pixel voltages remain within the hysteresis window. Then, at a state 282 after pulse 269 of waveform 268, element 254 has been placed in an unactuated state, and element 258 has been placed in an actuated state. Because the pixel voltages at elements 252 and 256 are within the hysteresis window, the elements remain in actuated and unactuated states, respectively.

It will be understood that this series of waveforms may be modified to produce variations of the checkerboard display pattern. For instance, by switching the row waveforms 266 and 268, an inverse of the above-described display pattern can be obtained. In alternate waveforms which produce the desired display pattern, the pulse 267, 269 of waveforms 266 and 268 may be the same length as the wide periods of constant voltage in waveforms 262 and 264, or other variations may be utilized, provided that the voltage exceeds the actuation voltage or falls below the release voltage for a time longer than the response time of the element. As discussed above, other waveforms which produce the desired voltages across particular elements may be utilized as equivalents to the above-discussed waveforms.

In another embodiment, certain interferometric modulator arrays may be configured to output grayscale. In a particular embodiment, outputting grayscale comprises the use of multiple individually actuatable elements within a pixel. For instance, one grayscale pixel may comprise one large element and one small element, where the output of the smaller elements is less than the output of the large elements (e.g., 50% in some embodiments). A monochrome display comprising such pixels is capable of outputting 2-bit grayscale, as selective actuation of the modulator elements permits the display of an all-bright pixel, an all-dark pixel, or two intermediate shades.

It will be understood that the testing methods previously discussed with respect to monochrome arrays may be used, without need for significant modification, in a 2-bit grayscale monochrome array. In one embodiment, the first set of every other row will address only the smaller modulator elements, and the second set of every other row will address only the larger modulator elements. Thus, when the first set is selectively driven to a dark state, the array will be a lighter gray, and when the second set is driven to a dark state, the array will be a darker gray. A variety of defects can be identified by the use of the various display patterns discussed below.

In further embodiments, additional levels of grayscale can be provided. In one embodiment, a monochrome display is capable of 3-bit grayscale. In this embodiment, a single pixel again contains multiple interferometric modulator elements of differing brightness (e.g., having different amounts of visible area). The components within a single pixel may be addressed by two row electrodes and two column electrodes. As before, however, it is be possible to selectively actuate columns and rows of interferometric modulators utilizing the display patterns discussed above. However, because these columns may comprise interferometric modulator elements of differing sizes, the actuation voltages of the elements within a single row or column may differ. Thus, it may be necessary to selectively actuate sets of similar interferometric modulator elements within the columns and rows.

In one embodiment, a first column comprises interferometric modulator elements of two different sizes, but these differing interferometric modulator elements are not connected to one another by a row electrode. Thus, one set of alternating rows can be used in conjunction with the first column electrode to address the modulators of a given size within that column, and a second set of alternating rows can be used in conjunction with the second column electrode to address the modulators of the other size within that column. Similarly, a second adjacent column may comprise interferometric modulator elements of two different sizes. In this embodiment, a single column can be driven to a known state by first driving a first set of elements within that column to a known state by applying appropriate waveforms to the column and the first set of row electrodes, and then driving a second set of elements within that column to the known state by applying appropriate waveforms to the column and the second set of electrodes. If alternating columns in an array are to be driven to the known state, the same waveform may be applied to each of the columns by an array. This may be done, for example, via a test pad connected via a buss bar which electrically connects each of an set of alternating columns.

Arrays having deeper grayscale capabilities may be tested by further modifying the methods and waveforms discussed above, or by providing equivalent waveforms which produce the desired voltages across certain elements. For instance, a polychrome device capable of grayseale may be provided in which each column of elements configured to reflect a particular color comprises two different pixel sizes, arranged in an alternating fashion. These columns may be selectively driven in the manner discussed with respect to the columns in the 3-bit grayscale array. Thus, for example, the red columns may be driven to a dark by applying a first waveform to each of the columns, and then applying a signal to a first set of alternating rows which actuates the larger pixels, and applying a signal to a second set of alternating rows which actuates the smaller pixels.

In further embodiment, it may be desirable to test a grayscale array by driving only elements of a particular size or brightness to a known state. Such a display pattern can be readily achieved through modification of the methods discussed above, such as by applying a first waveform to a first set of columns, and applying a second waveform to a first set of rows, where the second waveform comprises a signal which actuates certain elements in those rows, similar to waveforms of FIG. 16B which results in the creation of the checkerboard pattern.

It is to be recognized that, depending on the embodiment, the acts or events of any methods described herein can be performed in other sequences, may be added, merged, or left out all together (e.g., not all acts or events are necessary for the practice of methods), unless the text specifically and clearly states otherwise.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of inspecting an array of interferometric modulators, comprising:
    driving each modulator in the array of interferometric modulators to a known first state;
    applying a pulse to a subset of columns of the array of interferometric modulators to drive the interferometric modulators within the columns of the array from the known first state to a second state, wherein said second state is the opposite of said first state; and
    inspecting said array of interferometric modulators to identify defects in the array after application of the pulse.

2. The method of claim 1, wherein the known first state is a bright state, and wherein the second state is a dark state.

3. The method of claim 1, additionally comprising:
    driving each modulator in the array back to said known first state; and
    driving a second subset of columns of interferometric modulators within the array from said known first state to said second state.

4. The method of claim 3, additionally comprising:
    driving each modulator in the array back to said known first state; and
    driving a third subset of columns of interferometric modulators within the array from said known first state to said second state.

5. The method of claim 1, additionally comprising:
    driving each modulator in the array to a known third state; and
    driving a subset of rows of interferometric modulators within the array to a fourth state, wherein said fourth state is the opposite of said third state.

6. The method of claim 5, wherein said known third state is a bright state, and wherein said fourth state is a dark state.

7. The method of claim 5, additionally comprising:
    driving each modulator in the array back to said known third state; and
    driving a second subset of rows of interferometric modulators within the array to said known fourth state.

8. The method of claim 1, additionally comprising:
    driving each of the modulators in the array to a known fifth state; and
    driving each of the modulators in the array to a sixth state, wherein the sixth state is the opposite of the known fifth state.

9. The method of claim 8, wherein the known fifth state is a bright state and wherein the sixth state is a dark state.

10. The method of claim 1, wherein the array is formed on a substrate having a viewer side and a process side, the array being formed on the process side of the substrate.

11. The method of claim 10, additionally comprising placing a diffuser layer adjacent the viewer side of the substrate.

12. The method of claim 10, additionally comprising placing the substrate within a probe mount prior to driving the array.

13. The method of claim 1, additionally comprising determining an intra-column open based on the identified defects.

14. The method of claim 1, additionally comprising determining a row to column short based on the identified defects.

15. The method of claim 1, wherein the subset of columns comprises two non-adjacent columns but does not comprise a particular column between the non-adjacent columns.

16. A system for inspecting an array of interferometric modulators, comprising:
    an array driver configured to drive each modulator in the array of interferometric modulators to a known first state and to apply a pulse to a subset of columns of the array of interferometric modulators to drive the interferometric modulators within the columns of the array from the known first state to a second state, wherein said second state is the opposite of said first state;
    a camera configured to inspect said array of interferometric modulators; and
    a processor configured to identify defects in the array after application of the pulse based on the inspection.

17. A system for inspecting an array of interferometric modulators, comprising:
    means for driving each modulator in the array of interferometric modulators to a known first state;
    means for applying a pulse to a subset of columns of the array of interferometric modulators to drive the interferometric modulators within the columns of the array from the known first state to a second state, wherein said second state is the opposite of said first state; and
    means for inspecting said array of interferometric modulators to identify defects in the array after application of the pulse.

* * * * *